United States Patent [19]
Wagh et al.

[11] Patent Number: 5,624,493
[45] Date of Patent: Apr. 29, 1997

[54] QUICK-SETTING CONCRETE AND A METHOD FOR MAKING QUICK-SETTING CONCRETE

[75] Inventors: Arun S. Wagh, Joliet; Dileep Singh, Westmont, both of Ill.; Jose D. Pullockaran, Trenton, N.J.; Lerry Knox, Glen Ellyn, Ill.

[73] Assignee: The United States of America as represented by the Department of Energy, Washington, D.C.

[21] Appl. No.: 424,947

[22] Filed: Apr. 19, 1995

[51] Int. Cl.$^6$ ................................ G04B 7/38; G04B 7/43
[52] U.S. Cl. ........................... 106/817; 106/792; 106/793; 106/812; 106/739; 106/738
[58] Field of Search .................... 106/739, 738, 106/792, 793, 817, 812

[56] References Cited

U.S. PATENT DOCUMENTS

| | | | |
|---|---|---|---|
| 3,853,570 | 12/1974 | Nonis et al. | 106/738 |
| 4,205,994 | 6/1980 | Moyer, Jr. et al. | 106/738 |
| 4,773,934 | 9/1988 | Colin | 106/738 |
| 5,336,264 | 8/1994 | Constanz et al. | 623/16 |
| 5,374,308 | 12/1994 | Kirkpatrick et al. | 106/738 |

FOREIGN PATENT DOCUMENTS 2085865  5/1982  United Kingdom.

Primary Examiner—Mark L. Bell
Assistant Examiner—Michael Marcheschi
Attorney, Agent, or Firm—Hugh Glenn; Robert J. Fisher; William R. Moser

[57] ABSTRACT

A method for producing quick setting concrete is provided comprising hydrating a concrete dry mixture with carbonate solution to create a slurry, and allowing the slurry to cure. The invention also provides for a quick setting concrete having a predetermined proportion of $CaCO_3$ of between 5 and 23 weight percent of the entire concrete mixture, and whereby the concrete has a compression strength of approximately 4,000 pounds per square inch (psi) within 24 hours after pouring.

13 Claims, 2 Drawing Sheets

5,624,493

QUICK-SETTING CONCRETE AND A METHOD FOR MAKING QUICK-SETTING CONCRETE

CONTRACTUAL RIGHTS IN THE INVENTION

The United States Government has rights in this invention pursuant to Contract No. W-31-109-ENG-38 between the U.S. Department of Energy and the University of Chicago, representing Argonne National Laboratory.

BACKGROUND OF THE INVENTION

1. Field of the Invention

This invention relates to a method for producing concrete, and more specifically, this invention relates to a method for producing quick-setting concrete while simultaneously minimizing the release of carbon dioxide to the atmosphere, said release of carbon dioxide inherent in cement production.

2. Background of the Invention

Concrete is the most widely used material in the construction industry, with road construction being one of its biggest applications. An inherent problem with cement production, however, is the high level of carbon dioxide that is released therewith, per equation 1, infra:

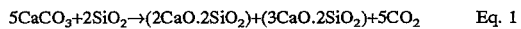

$$5CaCO_3 + 2SiO_2 \rightarrow (2CaO.2SiO_2) + (3CaO.2SiO_2) + 5CO_2 \qquad \text{Eq. 1}$$

wherein $CaCO_3$ is the calcareous material component (e.g., limestone) that is the source of $CO_2$ out-gassing during calcination, $SiO_2$ is argillaceous material (e.g., clay, shale, $Al_2O_3.SiO_2$), and the products, $\beta$-dicalcium silicate $(2CaO.SiO_2)$ and tricalcium silicate $(3CaO.SiO_2)$, are the major binding phases of cement.

The other source of $CO_2$ during cement production is the combustion of fuel (i.e. coal) that is required to produce the heat for calcining and clinkering the cement components. Generally, the decomposition of natural lime stone into calcium oxide requires reaction temperatures of approximately 850° C.

For each ton of cement produced, approximately one ton of $CO_2$ is produced by these two sources combined. By 2015, approximately 3,500 million tons of $CO_2$ will be produced annually worldwide from cement production. In anticipation of this increase, attempts are being made to reverse this trend. The Clean Air Act of 1990, for example, requires that emission of greenhouse gases be reduced to 1990 levels by the turn of the century. To comply with this and other mandates, the cement industry will require new $CO_2$ emission reducing technologies.

Another drawback of current concrete fabrication processes is the relatively long cure time of concrete. This is a particular problem in the manufacture of precast components. The economics of concrete use would be considerably enhanced if its curing time could be reduced. Current ASTM standards reflect the long setting rates, by requiring that concrete withstand a load factor of 4000 pounds per square inch (psi) after a 28 day set time.

A method of decreasing both $CO_2$ liberation and curing times previously has been reported in Nature Physical Science Vol. 240, pp. 16–18 (Nov. 6, 1972). The mechanism appears to involve a carbonation reaction in the aqueous film surrounding the surface particles of a concrete structure. During carbonation, impregnated $CO_2$ reacts with the silicates on the surface of the pores and grains of the structure.

That process exposes curing concrete to predetermined partial pressures of carbon dioxide. The drawbacks to this technique include incomplete carbonation, due to the inner regions of the grains remaining unreacted. Also, from a practical standpoint, it is not convenient to enclose cement structures, such as bridges and roads, in a carbonation chamber during curing.

Previous efforts at direct impregnation using $CO_2$ has resulted in the formation of a slurry having low pH. This low pH is contrary to the high pH values needed to facilitate the formation of a corrosion protective layer on steel that is used in the production of reinforced concrete structures.

A need exists in the art to ultimately minimize $CO_2$ burden in the atmosphere during cement production processes and also to minimize the long curing times now associated with concrete structure fabrication processes. An improved process necessarily must include a method for impregnating the entire microstructure of cement with $CO_2$, and without the need for placing the entire process in a carbonation chamber.

SUMMARY OF THE INVENTION

It is an object of the present invention to provide a method for producing quick-set concrete that overcomes many of the disadvantages of the prior art.

It is another object of the present invention to provide a method for producing concrete that cures in a matter of minutes A feature of the invention is the use of a carbonate fluid during concrete preparation. An advantage of the invention is a decrease in the $CO_2$ load in the atmosphere and a decrease in concrete set times compared to those times required by typical concrete production processes.

Yet another object of the present invention is to provide a method for producing steel reinforced concrete. A feature of the invention is the mixing of cement powder with a carbonate solution to form a slurry having a high pH. An advantage of the invention is more efficient bonding between the cement matrix and the reinforcement steel.

Briefly, the invention provides for a method for producing quick setting concrete comprising combining cement with aggregate to create a dry concrete mixture having a predetermined cement to concrete weight proportion, adding a carbonate solution to the mixture in a predetermined carbonate solution to cement ratio to create a slurry, and allowing the slurry to cure.

The invention also provides for a method for producing quick-setting concrete comprising heating a calcareous material with an argillaceous material in a predetermined proportion to a predetermined temperature to produce cement powder and carbon dioxide, bubbling the carbon dioxide through ammonia water to form ammonium carbonate solution, adding aggregate to the cement powder in a predetermined weight ratio to obtain a dry mixture, mixing the ammonium carbonate solution with the dry mixture in a predetermined ratio to form a slurry, and allowing the slurry to cure.

The invention also provides for a quick setting concrete having a predetermined proportion of $CaCO_3$ of between 5.7 and 22.5 weight percent of the entire concrete mixture.

BRIEF DESCRIPTION OF THE DRAWING

These and other objects and advantages of the present invention will become readily apparent upon consideration of the following detailed description and attached drawing wherein.

DETAILED DESCRIPTION OF THE INVENTION

Certain lime-based products harden over time when exposed to $CO_2$ in the atmosphere. The sequestration of $CO_2$ in portland cement is the result of reactions shown in Equations 2–4, infra. These reactions are written for both β-dicalcium silicate ($2CaO.SiO_2$), where n=2, and tricalcium silicate ($3CaO.SiO_2$), where n=3.

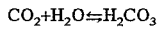   Eq. 2;

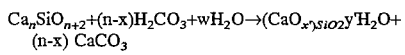   Eq. 3;

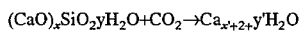   Eq. 4;

where w=y−n+x, and where x>x' and y>y'.

Equation 2 shows that the two major binding phases in cement, dicalcium silicate and tricalcium silicate, are responsible for the sequestration of $CO_2$ by forming calcium carbonate $CaCO_3$ in the process.

The invented method sets cement pastes rapidly and provides 28 day cure strengths in less than 24 hours. The invention also provides a method to sequester substantial amounts of "Greenhouse" dioxide by binding it permanently for storage.

Concrete samples were made with cement mixed with a carbonate solution. As stated infra, the ultimate use of the concrete determines what type of cement and solution is used in the preparation process. For example, in the fabrication of steel-reinforced concrete structures, the invented process promoting high slurry pH values by using; ammonium carbonate solution is particularly relevant.

Figure 1:
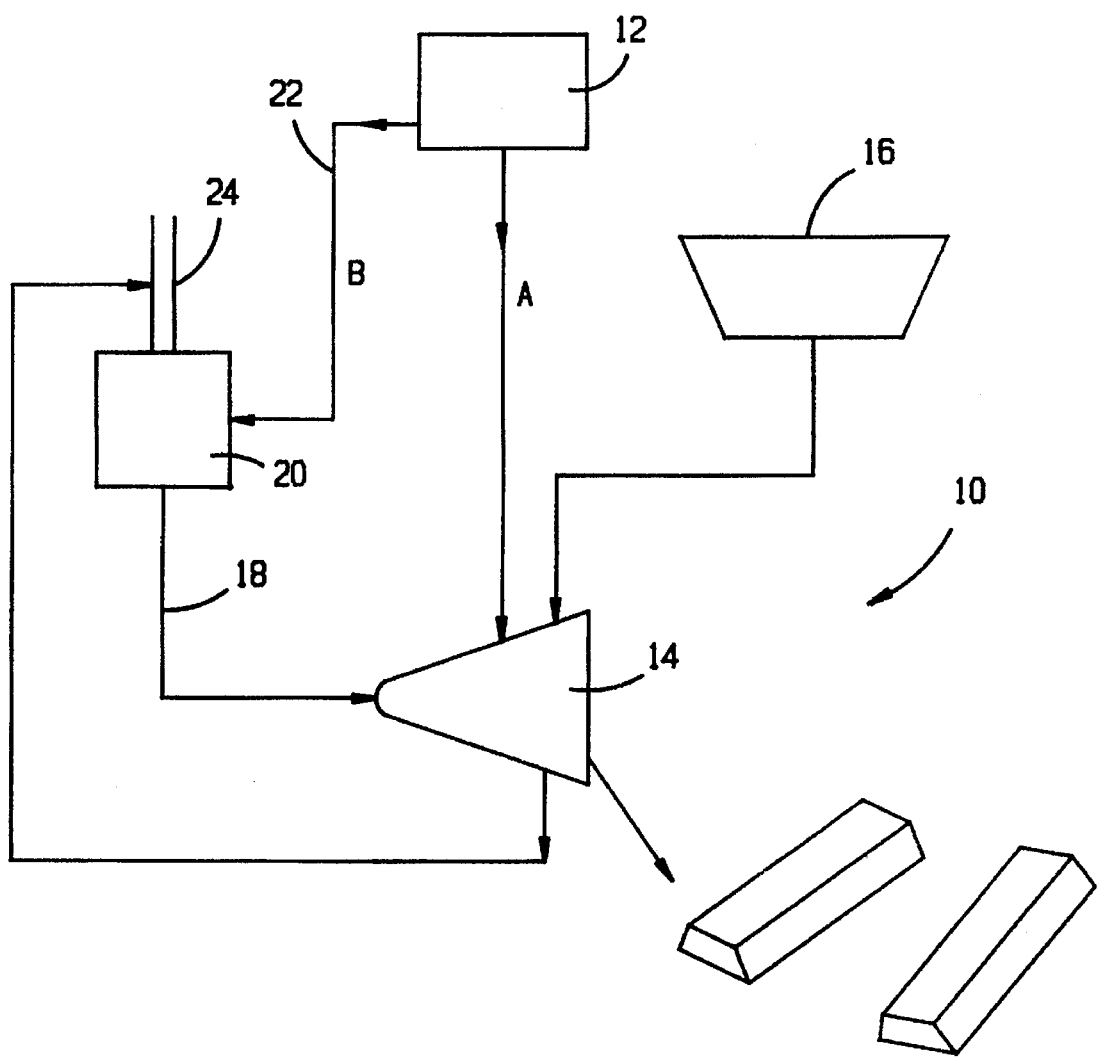
FIG. 1 is a schematic diagram of the concrete carbonation process, in accordance with the features of the present invention.

FIG. 1 depicts a schematic diagram of the invented process, designated as numeral 10 therein. Generally, a mixture 12 of a calcareous material, such as limestone, marl, chalk, or combinations thereof, and a argillaceous material, such as clay, shale, $Al_2O_3.SiO_2$, sand, or combinations thereof, is calcined at a predetermined temperature, ranging from between approximately 1,350° C. and 1,800° C.

The calcining process produces a solid phase stream, designated as stream A, which comprises CaO and other constituents, and a vapor phase stream, designated as stream B, which comprises $CO_2$. Stream A, representing the cement-powder feed stream, is mixed in a standard mixer 14 in predetermined proportions with aggregate material fed from an aggregate material supply source 16. Aggregate composition itself is predetermined, and comprises stone, sand, and other solids.

During the above-described dry mixing process, carbonate fluid is added to the mixer 14, via a carbonate fluid conduit means 18. Said fluid is formed in a carbonate forming reaction vessel 20 that is supplied with $CO_2$ gas. The $CO_2$ gas is supplied by the gaseous phase stream B emanating from the calcining reaction vessel 12, to the carbonate forming reaction vessel 20 via a gas transport means 22.

Carbonate Fluid Detail

Upon entering the carbonate forming reaction vessel 20, the $CO_2$ reacts with a hydroxide fluid that is supplied to the system via a hydroxide fluid supply means 24. The resulting fluid is a carbonate.

Depending on the final concrete forms to be produced, various carbonates or bicarbonates are used in the invented process. These carbonate fluids can be of varying concentrations, ranging from 50 percent to 100 percent saturated in water.

Generally, carbonates or bicarbonates to be used in the concrete carbonation process include $(NH4)_2CO_3$, $Li_2(CO_3)$, $Na_2(CO_3)$, $K_2(CO_3)_2$, $LiHCO_3$, $NaHCO_3$, and $KHCO_3$. These carbonates and bicarbonates are produced from the combination of $CO_2$ with ammonium hydroxide, lithium hydroxide, sodium hydroxide, and potassium hydroxide, respectively. Molarity of the hydroxide solutions can vary, but generally range from 0.1M to 0.5M. When ammonium hydroxide is utilized, preferable molarities range from between approximately 0.13 and 0.26M.

Ammonium carbonate $(NH_4)_2CO_3$, formed from the reaction of ammonium hydroxide and $CO_2$ gas, is a particularly relevant carbonate in as much as when it is mixed with cement, it produces a slurry pH of between 10 and 12, partially due to the formation of $NH_3$ during carbonate-cement mixing. This relatively high pH is ideal for facilitating the formation of a corrosion protection layer on steel used in reinforced concrete fabrication processes.

The exothermic reaction associated with the use of $(NH_4)_2CO_3$ in the concrete mixing process also enables fabrication of concrete structures at the relatively low temperature of approximately 0° C.

Alternatively, the high decomposition temperature of $Na_2CO_3$ makes this carbonate particularly attractive in high temperature concrete structure processing scenarios.

Cement Detail

A myriad of cement types can be used, or alternatively produced and then used, in the invented process to produce the desired concrete. Portland cement was used in the preparation of samples in as much as this cement is the not only the most widely used but also that it has a high content of tricalcium- and dicalcium-silicate. There are five types (Types I–V) of portland cement, with their CaO weight percents ranging from between 62 and 65 percent. More specifically, Type I portland contains 64.4 percent of CaO, Type II contains 63.6 percent, Type III contains 64.9 percent, Type IV contains 62.3 percent, and Type V contains 64.4 percent.

White cement is yet another cement type that yields good results with the invented process, said cement having a 65 weight percent of CaO to the entire cement mixture.

Generally, cement comprising lime (62–80 weight percent), chalcedony (13–20 percent), alumina (2–8 percent), iron (0.1–2 percent) and gypsum (0.1–2 percent) provides good cement material. The weight ratios of calcareous material to argillaceous material in portland or white cements range from approximately 74:26 to 77:23.

Aggregate Detail

Figure 2:
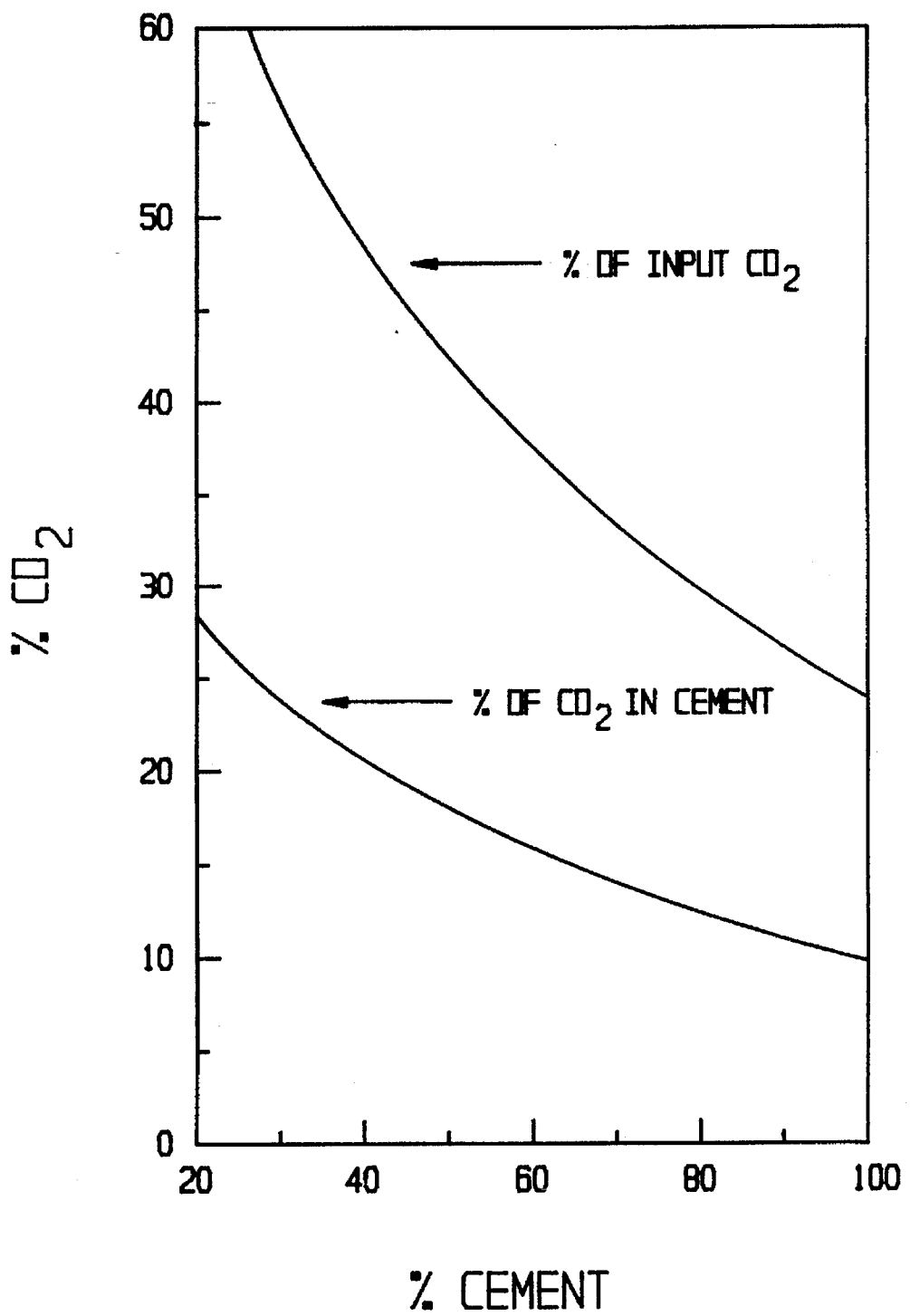
FIG. 2 is a graph depicting the extent of cement carbonation with concrete constituent changes, in accordance with the features of the present invention.

The proportion of aggregate to the cement powder will vary in weight percent, depending on the final use of the product. A cement-to-concrete weight percent of from 10 percent to 80 percent produces good results. As depicted in FIG. 2, the inventors have found that the amount of aggregate (noncement material) added to a cement powder directly effects the extent of carbonation of cement particles. For example, as the top curve in FIG. 2 depicts, a mixture of 30 percent cement to total concrete results in an uptake by the cement of more than half (56 percent) of the $CO_2$ that was initially liberated in the production of the cement. The lower curve depicts that at 30 weight percent cement to the concrete mixture, sequestered $CO_2$ represents 24 weight percent of the cement.

As more cement is added, or conversely as less aggregate is added, decreased carbonation occurs. This is due to less porosity being present, and therefore less opportunity of exposure of internally situated cement particles to the carbonate solution.

EXAMPLE

Ammonium hydroxide, when reacted with $CO_2$, gives ammonium carbonate, at room temperature by the reaction shown infra in Equation 5:

$$2NH_4OH + CO_2 \rightarrow (NH_4)_2CO_3 + H_2O \qquad \text{Eq. 5}$$

In as much as ammonium carbonate is water soluble, the water added for the concrete hydration reaction provides a vehicle for $CO_2$ to reach individual cement particles. Upon hydration, setting portland cement displays a pH of approximately 10, and due to the exothermic reaction of the setting mechanism, the slurry temperature is warm. In as much as ammonium carbonate decomposes in alkaline and hot environments, the slurry environment described supra induces decomposition of the ammonium carbonate into ammonia and $CO_2$. The ammonia released during this phase of the process can be collected and bubbled through water to subsequently capture $CO_2$ in the carbonate reaction chamber 20.

A saturated solution of ammonium carbonate was used. The amount of carbonate solution added to the cement powder is governed by the workability of the resulting slurry or paste. Too much solution makes the paste too dilute and it does not set into required shapes. In portland Type I cement, the inventors found that a good weight ratio of cement to solution is between 4:1 and 6:1; preferably 5:1. When ammonium carbonate is used, preferable ratios of carbonate to dry concrete mixture can be selected from between approximately 9:100 and 24:100.

For a saturated solution, equal amounts by weight of $(NH_4)_2CO_3$ and water are combined. To form a supersaturated solution, 28 grams of $(NH_4)_2CO_3$ to 20 grams of water are combined with 100 grams of cement powder and thoroughly mixed. Mixing and molding lasted for 15 minutes. During this time, ammonia was released from the samples, signifying decomposition of the carbonate into $CO_2$ and $NH_3$. (Samples were prepared in sizes and shapes that were convenient to subsequent testing and analysis. Such sample fabrication included pouring the hot slurry into a geometrical mold of a predetermined shape, e.g., a cylinder, and subjecting the now-shaped slurry to pressures of approximately 1,500 to 2,500 psi. This mixing and molding sequence would last for approximately 10 to 15 minutes.)

After a slow rise of the temperature of the mixture for the first 12 minutes, the temperature was 52° C. within the next three minutes. The mixture temperature dropped equally fast and was 22° C. in the next 5 minutes of curing.

The initial moderate temperature increase releases $CO_2$ from the carbonate solution. Subsequent capture of the gas sets the cement faster, which raises the temperature further. This process continues, for approximately 15 minutes, noted supra, until all $(NH_4)_2CO_3$ decomposes and all $CO_2$ is captured. After this period, the cement returns to its normal setting rate and the temperature falls due to dissipation of the heat energy. Ergo, most of the setting of the cement occurs in the first 15 minutes, with compression strengths of 4,000 psi reached within 30 minutes of initial mixing.

The resulting concrete produced from the invented process has $CaCO_3$ weight percentages of between approximately 5.7 when cement comprises 10 percent of the concrete mixture, and 22.5 percent $CaCO_3$ when cement comprises 80 percent of the concrete mixture. This corresponds to a $CaCO_3$ to cement weight ratio of 18 percent to 57 percent, respectively.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for producing quick setting concrete comprising:

a.) heating a mixture consisting of a calcareous material and an argillaceous material to produce cement powder and carbon dioxide;

b.) mixing said carbon dioxide with an hydroxide solution to produce a carbonate solution;

c.) combining said cement powder with aggregate to produce a dry concrete mixture whereby 10 to 80 percent of the weight of the concrete mixture is cement;

d.) mixing said dry concrete mixture with said carbonate solution in a cement:carbonate solution weight ratio selected from approximately 4:1 to 6:1 to produce a slurry; and e.) allowing the slurry cure.

2. The method as recited in claim 1 wherein the carbonate solution is comprised of water and a carbonte compound selected from the group consisting of $(NH_4)_2OO_3$, $Li_2(CO_3)$, $Na_2(CO_3)$, $K_2(CO_3)$, $LiHCO_3$, $NaHCO_3$, $KHCO_3$, and combinations thereof.

3. The method as recited in claim 2 wherein the carbonate solution is between approximately 50 percent and 100 percent saturated in water.

4. The method as recited in claim 1 wherein the cement-:carbonate solution weight ratio is 5:1.

5. A method for producing quick-setting concrete a.) heating a mixture consisting of calcareous material and argillaceous material to a temperature selected from between 1,350° and 1800° C. to produce cement powder and carbon dioxide; said mixture having a weight ratio of calcareous material to argillaceous material of between approximately 74:26 and 77:23 b.) bubbling the carbon dioxide through ammonium hydroxide solution to form ammonium carbonate solution;

c.) adding aggregate to the cement powder to produce a dry mixture of concrete, said dry mixture of concrete having from 10 to 80 percent of its weight consisting of cement;

d.) mixing the ammonium carbonate solution with the dry mixture of concrete in an ammonium carbonate to dry mixture of concrete weight ratio of between 9:100 and 24:100 to form a slurry; and e.) allowing the slurry to cure.

6. The method as recited in claim 5 wherein the calcareous material comprises limestone, marl, or combinations thereof.

7. The method as recited in claim 5 wherein the argillaceous material comprises clay, shale, sand, or combinations thereof.

8. The method as recited in claim 5 wherein the ammonium hydroxide solution has a molarity selected from a range of between approximately 0.13 and 0.26 molar.

9. A quick-setting concrete having a weight percent of $CaCO_3$ of between approximately 5.7 and 22.5 and whereby between 10 and 24 percent of the weight of the $CaCO_3$ is sequestered $CO_2$, said $CO_2$ is generated during production of the concrete.

10. The concrete as recited in claim 9 wherein the concrete achieves a compression strength of approximately 4,000 pounds per square inch within 24 hours of initial mixing.

11. The concrete as recited in claim 10 wherein the 4,000 pounds per square inch compression strength is attained within 30 minutes of initial mixing.

12. The method as recited in claim 1 wherein the hydroxide solution is selected from the group consisting of ammonium hydroxide, lithium hydroxide, sodium hydroxide and potassium hydroxide.

13. The method as recited in claim 1 wherein the hydroxide solution has a molarity selected from the range of between approximately 0.1M and 0.5M.

* * * * *